US011399410B2

(12) United States Patent
Islam et al.

(10) Patent No.: US 11,399,410 B2
(45) Date of Patent: Jul. 26, 2022

(54) TECHNIQUES FOR CONTROLLING TIMING OF DOWNSTREAM NODES IN WIRELESS COMMUNICATIONS

(71) Applicant: QUALCOMM Incorporated, San Diego, CA (US)

(72) Inventors: Muhammad Nazmul Islam, Littleton, MA (US); Tao Luo, San Diego, CA (US); Navid Abedini, Somerset, NJ (US); Jianghong Luo, Skillman, NJ (US); Junyi Li, Chester, NJ (US); Karl Georg Hampel, Hoboken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 259 days.

(21) Appl. No.: 16/502,488

(22) Filed: Jul. 3, 2019

(65) Prior Publication Data
US 2020/0015316 A1 Jan. 9, 2020

Related U.S. Application Data

(60) Provisional application No. 62/695,565, filed on Jul. 9, 2018.

(51) Int. Cl.
*H04L 12/43* (2006.01)
*H04W 80/02* (2009.01)
(Continued)

(52) U.S. Cl.
CPC .......... *H04W 80/02* (2013.01); *H04L 5/0094* (2013.01); *H04W 56/0045* (2013.01); *H04W 72/1257* (2013.01); *H04W 74/0833* (2013.01)

(58) Field of Classification Search
CPC ......... H04W 74/0833; H04W 72/1257; H04W 72/042; H04W 72/04; H04W 72/02; H04W 56/0045; H04W 80/02; H04L 5/0094
(Continued)

(56) References Cited

U.S. PATENT DOCUMENTS 10,027,401 B2 7/2018 Speight et al.
10,206,232 B2 2/2019 Novlan et al.
(Continued)

FOREIGN PATENT DOCUMENTS

EP 2568755 A1 * 3/2013 .......... H04W 72/042
EP 2568755 A1 3/2013
(Continued)

OTHER PUBLICATIONS

Huawei et al., "Physical Layer Enhancement Consideration on IAB", , 3GPP Draft, 3GPP TSG RAN WG 1 Meeting #93, R1-1805925, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 20, 2018 (May 20, 2018), XP051441144, 8 Pages, Retrieved from the Internet: URL: http://www.3gpp.org/ftp/Meetings%5F3GPP%5FSYNC/RAN1/Docs/ [retrieved on May 20, 2018], Section 2.2.
(Continued)

*Primary Examiner* — Candal Elpenord
(74) *Attorney, Agent, or Firm* — Arent Fox, LLP

(57) ABSTRACT

Aspects described herein relate to communicating timing advance (TA) values in an integrated access and backhaul (IAB) network. A first node in a wireless network can receive a media access control (MAC) control element (CE) indicating a downlink transmission timing advance for trans-
(Continued)

mitting downlink communications. The first node can transmit downlink communications based on the MAC CE.

56 Claims, 10 Drawing Sheets

(51) Int. Cl.
*H04W 56/00* (2009.01)
*H04W 72/12* (2009.01)
*H04W 74/08* (2009.01)
*H04L 5/00* (2006.01)

(58) Field of Classification Search
USPC .................................................. 370/329–330
See application file for complete search history.

(56) References Cited

U.S. PATENT DOCUMENTS

| | | | |
|---|---|---|---|
| 2014/0010143 A1 | 1/2014 | Barrett | |
| 2014/0036760 A1* | 2/2014 | Ljung | H04B 7/15557 370/315 |
| 2014/0254468 A1* | 9/2014 | Raaf | H04W 16/26 370/315 |
| 2016/0192376 A1* | 6/2016 | Lee | H04W 48/20 370/252 |
| 2016/0219578 A1* | 7/2016 | Lim | H04B 7/024 |
| 2016/0227505 A1* | 8/2016 | Loehr | H04W 72/0413 |
| 2017/0142620 A1* | 5/2017 | Rune | H04W 36/0061 |
| 2019/0028980 A1* | 1/2019 | Feuersaenger | H04W 52/346 |
| 2019/0029017 A1* | 1/2019 | Chen | H04W 48/16 |
| 2019/0053183 A1 | 2/2019 | Park et al. | |
| 2019/0110266 A1 | 4/2019 | Abedini et al. | |
| 2019/0223178 A1* | 7/2019 | Bergström | H04W 72/0406 |
| 2019/0349036 A1* | 11/2019 | Wang | H04B 7/14 |
| 2019/0349871 A1* | 11/2019 | Ghosh | H04W 56/001 |
| 2020/0163097 A1* | 5/2020 | Qin | H04W 84/047 |
| 2020/0245200 A1* | 7/2020 | Xiong | H04B 7/0695 |
| 2020/0245354 A1* | 7/2020 | Kazmi | H04W 16/14 |
| 2020/0337000 A1* | 10/2020 | Kim | H04W 56/00 |
| 2020/0383073 A1* | 12/2020 | Liu | H04W 56/001 |
| 2021/0058883 A1* | 2/2021 | Lu | H04B 7/15528 |
| 2021/0058884 A1* | 2/2021 | Liu | H04J 3/06 |

FOREIGN PATENT DOCUMENTS

| | | | | |
|---|---|---|---|---|
| EP | 2947933 A1 | 11/2015 | | |
| WO | WO-2010148947 A1 * | 12/2010 | ............ | H04W 56/00 |
| WO | WO-2020191745 A1 * | 10/2020 | ............ | H04W 56/00 |

OTHER PUBLICATIONS

International Search Report and Written Opinion—PCT/US2019/040660—ISA/EPO—dated Oct. 10, 2019.
Nokia et al., "IAB Synchronization", 3GPP TSG RAN WG 1 Meeting #93, 3GPP Draft; R1-1806664_IAB Synchronization Final, 3rd Generation Partnership Project (3GPP), Mobile Competence Centre, 650, Route Des Lucioles ; F-06921 Sophia-Antipolis Cedex, France, vol. RAN WG1, No. Busan, Korea; May 21, 2018-May 25, 2018, May 20, 2018 (May 20, 2018), 5 Pages, XP051441866, Retrieved from the Internet: URL: http://www.3gpp.org/ftp/Meetings%5F3GPP%5FSYNC/RAN1/Docs/ [retrieved on May 20, 2018].
Nokia et al., "NR Support for IAB", 3GPP TSG RAN WG 1 Meeting #93, 3GPP Draft; R1-1806660_NR Support for IAB_Final, 3rd Generation Partnership Project (3GPP), Mobile Competence Centre, 650, Route Des Lucioles ; F-06921 Sophia-Antipolis Cedex, France, vol. RAN WG1, No. Busan, Korea; May 21, 2018-May 25, 2018, May 20, 2018 (May 20, 2018), 5 Pages, XP051441862,Retrieved from the Internet: URL: http://www.3gpp.org/ftp/Meetings%5F3GPP%5FSYNC/RAN1/Docs/ [retrieved on May 20, 2018], Section 2.4.

* cited by examiner

TECHNIQUES FOR CONTROLLING TIMING OF DOWNSTREAM NODES IN WIRELESS COMMUNICATIONS

CLAIM OF PRIORITY UNDER 35 U.S.C. § 119

The present application for patent claims priority to Provisional Application No. 62/695,565, entitled "TECHNIQUES FOR CONTROLLING DOWNLINK TRANSMISSION TIMING OF DOWNSTREAM NODES IN WIRELESS COMMUNICATIONS" filed Jul. 9, 2018, which is assigned to the assignee hereof and hereby expressly incorporated by reference herein for all purposes.

BACKGROUND

Aspects of the present disclosure relate generally to wireless communication systems, and more particularly, to wireless communications using integrated access and backhaul (IAB) networks.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired. IAB networks, which may use 5G NR radio access technologies, include an access network between access nodes (ANs) and user equipment (UEs), and a backhaul network between ANs, where radio resources may be shared between the access and backhaul networks. This, however, may lead to conflict over which resources are used for access network communications and which resources are used for backhaul network communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communications is provided that includes receiving, by a first node in a wireless network, a media access control (MAC) control element (CE) including an indication of a downlink transmission timing advance for transmitting downlink communications to a downstream node, and transmitting the downlink communications from the first node to the downstream node based on the MAC CE.

In another example, an apparatus for wireless communication is provided that includes a transceiver, a memory configured to store instructions, and one or more processors communicatively coupled with the transceiver and the memory. The one or more processors are configured to receive a MAC CE including an indication of a downlink transmission timing advance for transmitting downlink communications to a downstream node, and transmit the downlink communications to the downstream node based on the MAC CE.

In another example, an apparatus for wireless communication is provided that includes means for receiving a MAC CE including an indication of a downlink transmission timing advance for transmitting downlink communications to a downstream node, and means for transmitting the downlink communications to the downstream node based on the MAC CE.

In another example, a non-transitory computer-readable medium including code executable by one or more processors for wireless communications is provided. The code includes code for receiving, by a first node in a wireless network, a MAC CE including an indication of a downlink transmission timing advance for transmitting downlink communications to a downstream node, and transmitting the downlink communications from the first node to the downstream node based on the MAC CE.

In one example, a method for wireless communication is provided. The method includes transmitting, by a first node to a downstream node, an indication of an uplink transmission timing advance for transmitting uplink communications to the first node, and transmitting, by the first node to the downstream node, an indication of a downlink transmission timing advance for transmitting downlink communications from the downstream node.

In another example, an apparatus for wireless communication is provided that includes a transceiver, a memory configured to store instructions, and one or more processors communicatively coupled with the transceiver and the memory. The one or more processors are configured to transmit, to a downstream node, an indication of an uplink transmission timing advance for transmitting uplink communications to the apparatus, and transmit, to the downstream node, an indication of a downlink transmission timing advance for transmitting downlink communications from the downstream node.

In another example, an apparatus for wireless communication is provided that includes means for transmitting, to a downstream node, an indication of an uplink transmission timing advance for transmitting uplink communications to the apparatus, and transmitting, to the downstream node, an indication of a downlink transmission timing advance for transmitting downlink communications from the downstream node.

In another example, a non-transitory computer-readable medium including code executable by one or more processors for wireless communications is provided. The code includes code for transmitting, by a first node to a downstream node, an indication of an uplink transmission timing advance for transmitting uplink communications to the first node, and transmitting, by the first node to the downstream node, an indication of a downlink transmission timing advance for transmitting downlink communications from the downstream node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
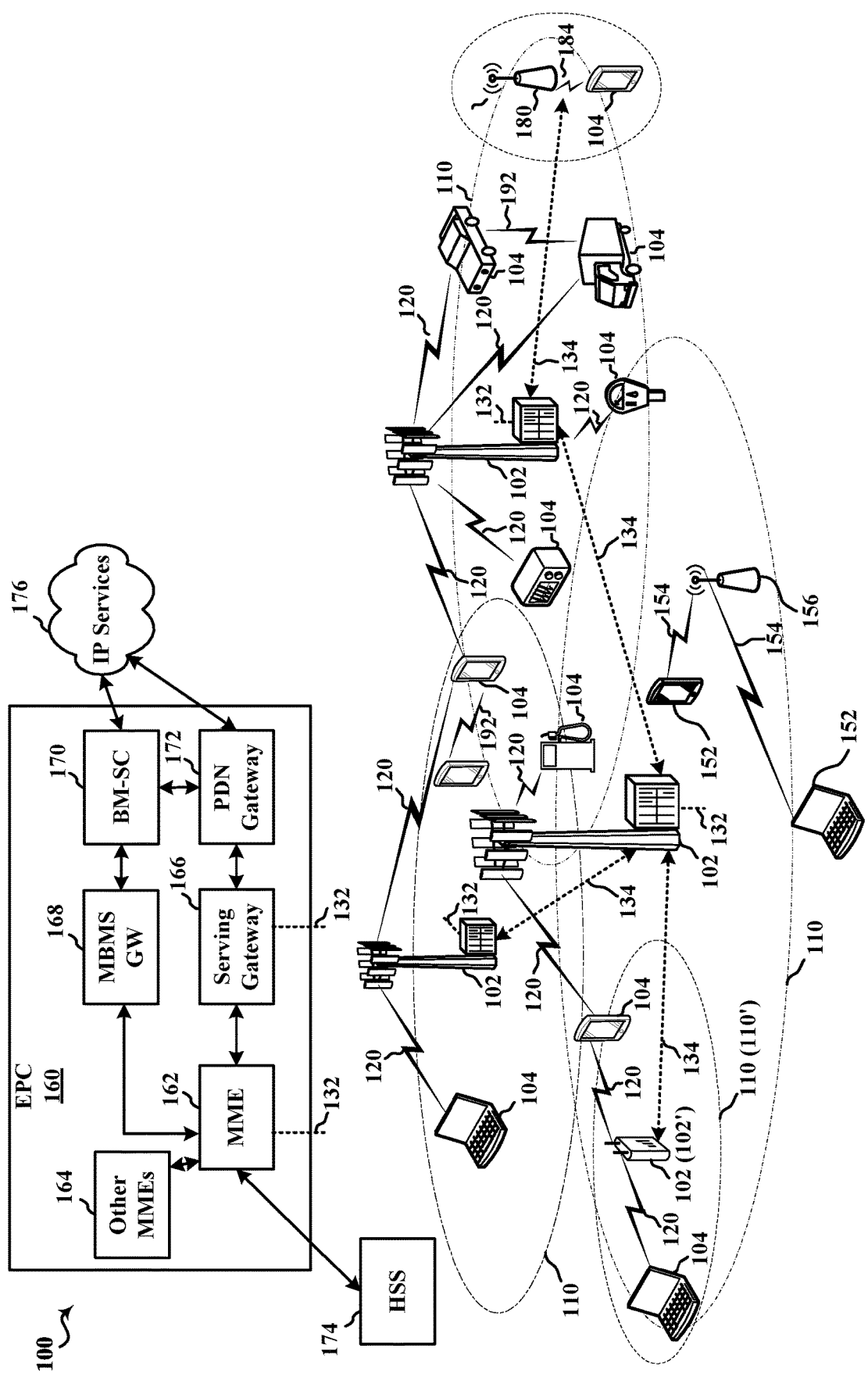
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to configuring access network communication timing and backhaul network communication timing to facilitate coexistence of the access network communications and backhaul network communications over a set of frequency resources. In an example, an integrated access and backhaul (IAB) network can include one or more IAB-donor nodes that terminate a Ng interface with a core network. The IAB network can also include one or more IAB-nodes that provide IAB functionality including an access node (AN) function (AN-F) for scheduling user equipment (UEs) and other IAB-nodes, and a UE function (UE-F) that is scheduled by a parent node (e.g., the IAB-donor or another upstream IAB-node). The IAB network may also include one or more UEs connected to one or more of the IAB-nodes. To facilitate coexistence of communications over the access network (e.g., communications between a UE and an IAB-node) and communications over the backhaul network (e.g., communications between IAB-nodes and/or with IAB-nodes and the IAB-donor), downlink and uplink transmission timing can be aligned for various nodes. Due to delay in transmitting and receiving communications, a timing advance (TA) can be applied to facilitate aligning the downlink and uplink transmission timings of the various nodes.

Aspects described herein relate to mechanisms for conveying the TA at least for a downlink transmission time of an IAB-node for transmitting data to one or more downstream IAB-nodes and/or UEs. In an example, the TA can be conveyed to a first IAB-node by an upstream IAB-node and/or IAB-donor using a media access control (MAC) control element (CE), and can be sent by the upstream IAB-node's AN-F and received by the first IAB-node's UE-F. The first IAB-node can accordingly schedule downlink transmissions to the one or more distributed units (DU), which may include one or more downstream IAB-nodes or UEs, based on the received TA. In one example, the TA for the downlink transmission time can be conveyed to the first IAB-node by the upstream IAB-node and/or IAB-donor as a value relative to an uplink transmission TA configured by the upstream IAB-node and/or IAB-donor. In another example, the upstream IAB-node can also convey an uplink transmission TA to the first IAB-node, and the first IAB-node can additionally apply the uplink transmission TA in scheduling uplink transmissions to the upstream IAB-node.

The described features will be presented in more detail below with reference to FIGS. 1-10.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Referring to FIG. 1, in accordance with various aspects described herein, an example of a wireless communication access network 100 is depicted. The wireless communication access network 100 can include one or more UEs 104 and/or one or more base stations 102 that may communicate with other UEs and/or other base stations via an Evolved Packet Core (EPC) 160. The base stations 102 (which can be collectively referred to as Evolved Universal Mobile Telecommunications System (UMTS) Terrestrial Radio Access Network (E-UTRAN)) may interface with the EPC 160 through first backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over second backhaul links 134 (e.g., X2 interface). The second backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Y*x MHz (where x can be a number of component carriers) used for transmission in each direction. The carriers may or may not be adjacent to or contiguous with each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 156 in communication with Wi-Fi stations (STAs) 152 via communication links 154 in a 5 GHz unlicensed frequency spectrum. When communicating in an unlicensed frequency spectrum, the STAs 152/AP 156 may perform a clear channel assessment (CCA) prior to communicating in order to determine whether the channel is available. In one example, aspects described herein in the context of a base station 102 may be employed, where appropriate, by an AP 156. Similarly, for example, aspects described herein in the context of a UE 104 may be employed, where appropriate, by a STA 152.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 156. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as a mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 can be a control node that processes signaling between the UEs 104 and the EPC 160. Generally, the MME 162 can provide bearer and connection management. User Internet protocol (IP) packets (e.g., of or relating to the UE 104) can be transferred through the Serving Gateway 166, which itself is connected to the PDN Gateway 172. The PDN Gateway 172 can provide UE IP address allocation as well as other functions. The PDN Gateway 172 and the BM-SC 170 can be connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for one or more UEs 104. Examples of UEs 104 include factory equipment or nodes, as described above, a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

As described in examples herein, wireless communication access network 100 can provide a framework for an IAB network. In an example, the IAB can include an access network between ANs and UEs, and a backhaul network between ANs. The IAB network can generally include anchor nodes including ANs with a wireline or other connection to a network (e.g., to an EPC), and one or more relay nodes that relay traffic from/to the anchor nodes via one or more hops. An IAB network may use a similar framework as the wireless communication access network 100, where a base station 102 may be an anchor node to the EPC, and a UE 104 may be a UE or a relay node to relay traffic from the anchor node to other UEs. In this example, a UE 104 that functions as a relay node can include 1) a AN function for communicating with one or more UEs or downstream relay nodes (e.g., by transmitting over a downlink and receiving over an uplink), and 2) a UE function for communicating with an anchor node and/or one or more upstream relay nodes (e.g., by transmitting over an uplink and receiving over a downlink). As described, an IAB network can share resources between access and backhaul, and may operate using a 5G NR radio access technology. One specific example of an IAB network is shown in FIG. 2.

Figure 2:
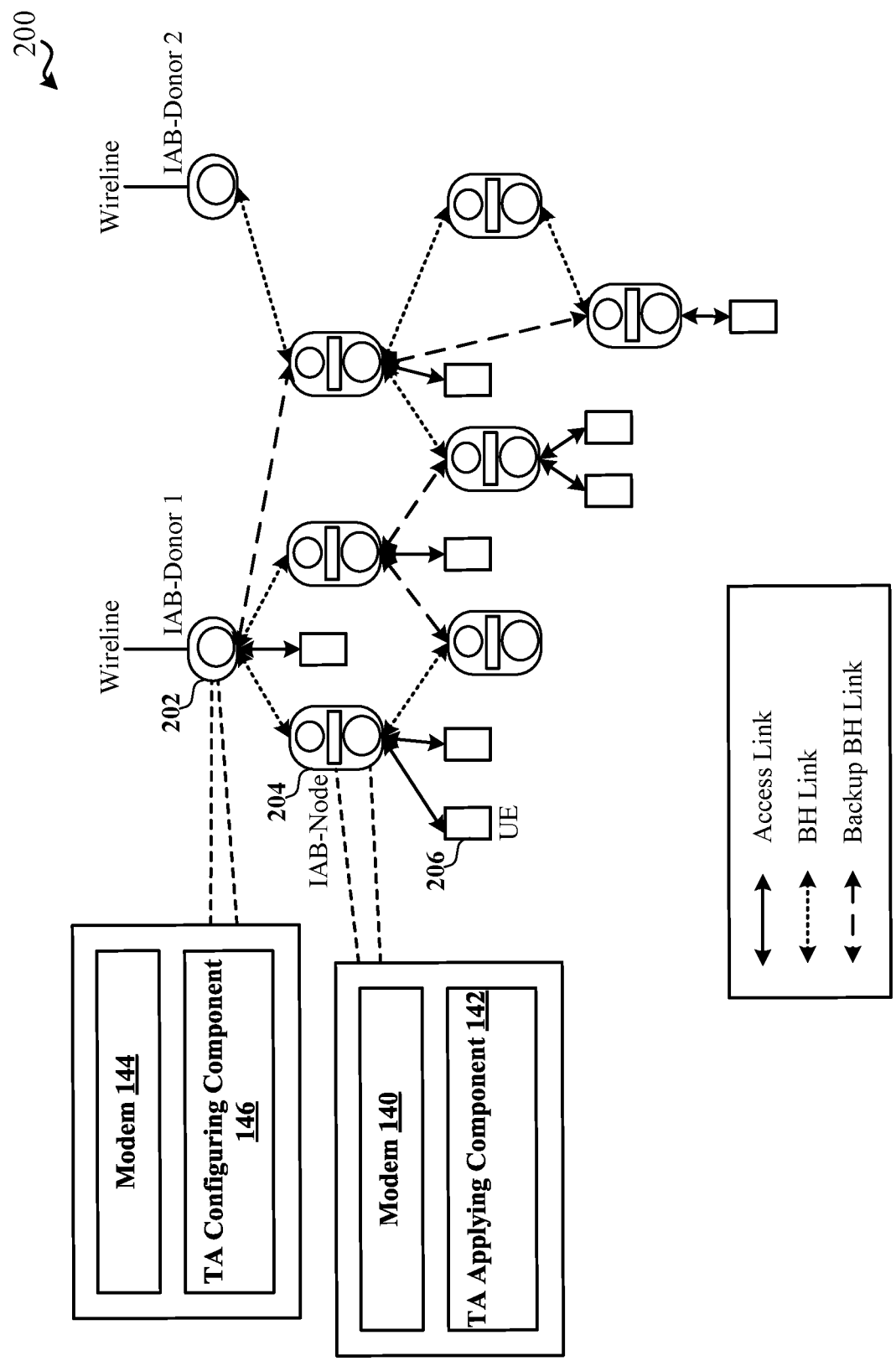
FIG. 2 illustrates an example of a wireless communication system that provides an integrated access and backhaul (IAB) network, in accordance with various aspects of the present disclosure.

Referring to FIG. 2, in accordance with various aspects described herein, an example of another wireless communication access network 200 that can provide IAB is depicted. The wireless communication access network 200 can include one or more IAB-donor nodes 202, which may be anchor nodes, one or more IAB-nodes 204, which may be relay nodes, and one or more UEs 206. Generally, as used herein, a downstream node can refer to a node that is downstream, e.g., closer to a UE, from a connected upstream node. For example, IAB-node 204 is a downstream node of IAB-Donor 1 202. Similarly, as used herein, an upstream node can refer to a node that is upstream, e.g., closer to a network, from a connected downstream node. For example, IAB-Donor 1 202 is an upstream node of IAB-Node 204. In addition, a node can generally transmit over a downlink to its downstream node(s), and/or can generally receive over an uplink from its uplink node(s).

In an example, the IAB-donor nodes 202 can include a wireline connection to a network (e.g., one or more backend network components, such as one or more components in EPC 160 described in FIG. 1) and may terminate a Ng interface. In one example, the IAB-donor nodes 202 can be, or can provide similar functionality as, base stations 102. The IAB-nodes 204 can provide the AN-F and the UE-F, as described. In this regard, the IAB-nodes 204 can communicate with the IAB-donor node 202 or other upstream IAB-nodes using the UE-F, which is controlled and scheduled by the IAB-donor node 202 or other upstream IAB-node 204 connected as parent nodes, and uses a backhaul link. For example, connection and/or communication between an IAB-node 204 and an IAB-donor node 202 (and/or between an IAB-node 204 and another upstream IAB-node 204) can be similar to that described respectively between UE 104 and base station 102 in FIG. 1. In addition, for example, the IAB-nodes 204 can also communicate with one or more UEs 206 or other downstream IAB-nodes 204 using the AN-F, which can provide similar functions as base station 102 including scheduling communications for the UEs 206 and/or other downstream IAB-nodes 204 connected as child nodes, and controlling both access links and backhaul links under its coverage.

In an example, an IAB network can support TA-based synchronization between IAB nodes, which may include supporting TA-based synchronization across multiple backhaul hops. Some example supported TA-based synchronization cases are illustrated in FIG. 3.

Figure 3:
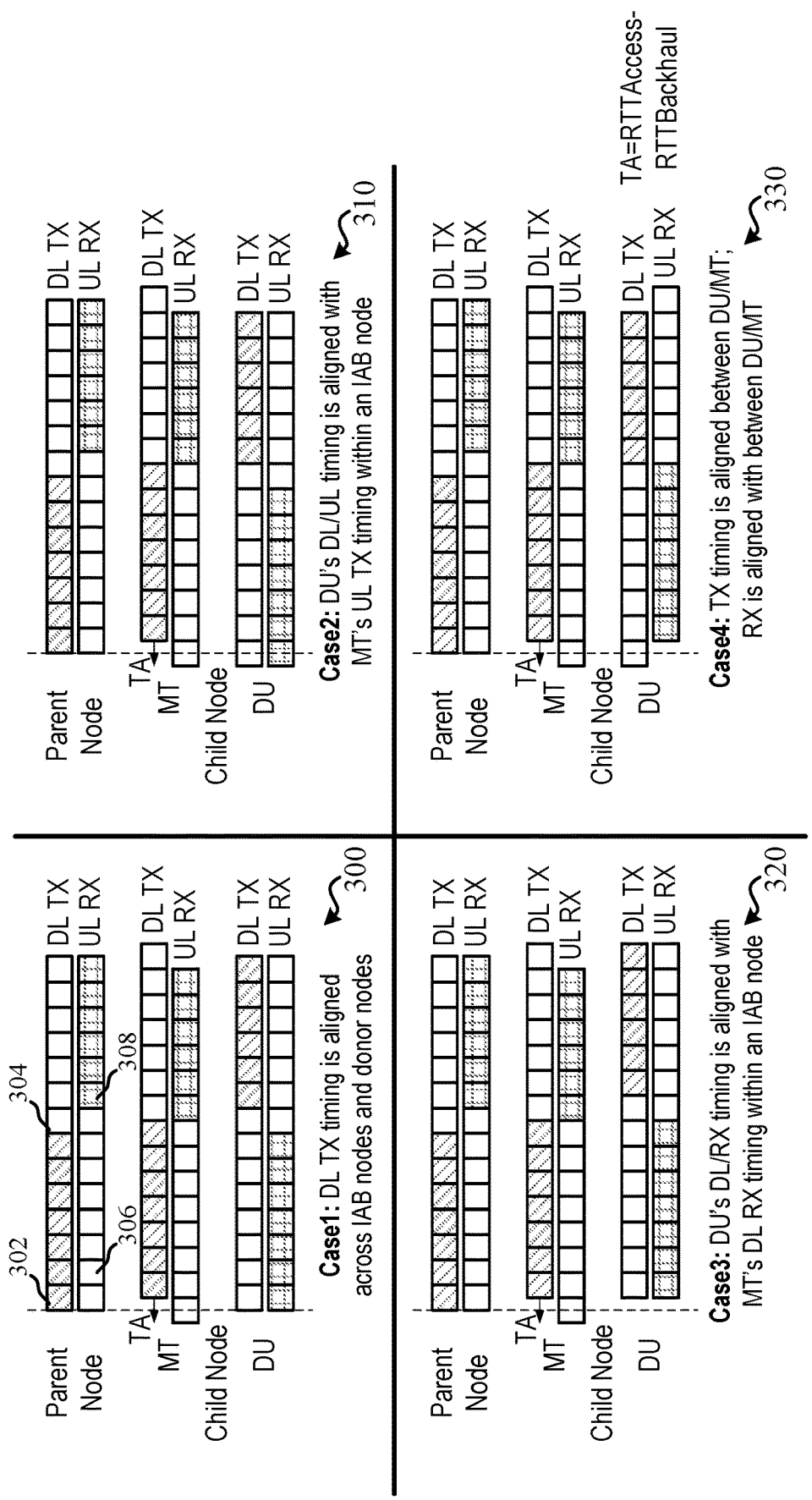
FIG. 3 illustrates examples of cases for aligning timing among IAB-nodes, in accordance with various aspects of the present disclosure.

FIG. 3 illustrates multiple cases of TA-based synchronization among nodes in an IAB network. For example, Case 1 300 illustrates supporting DL transmission timing alignment across IAB nodes and donor nodes (e.g., across DU and parent node). For each case in FIG. 3, symbols are shown for each of a parent node (such as an upstream IAB node), and child nodes, which may include a DU (such as a downstream IAB-node that is downstream of the upstream IAB node), and a mobile terminal (MT). The symbols for each node can include DL Tx symbols such as symbols 302 indicating symbols over which transmitting downlink communications can be scheduled and symbols 304 over which transmitting downlink communications cannot be scheduled at the node. The symbols for each node can also include UL Rx symbols such as symbols 306 indicating symbols over which receiving uplink communications cannot be scheduled and symbols 308 over which receiving uplink communications can be scheduled at the node. In another example, Case 2 310 illustrates supporting DL and UL transmission timing aligned within an IAB node (e.g., DU), such that a DU's DL/UL timing can be aligned with an MT's UL Tx timing within an IAB node. In another example, Case 3 320 illustrates supporting DL and UL reception timing aligned within an IAB node (e.g., DU), such that a DU's DL/Rx timing can be aligned with a MT's DL Rx timing within an IAB node. In yet another example, Case 4 330 illustrates supporting TA-based synchronization within an IAB node, when transmitting using Case 2 while when receiving using Case 3, such that a Tx timing can be aligned between a DU/MT and Rx can be aligned with between a DU/MT. In yet another example, Case 5 can include supporting Case 1 for access link timing and Case 4 for backhaul link timing within an IAB node in different time slots. Other alignments/supported TA-based synchronization cases may be possible as well, such as Slot alignment, Symbol-level alignment, or No alignment. In addition, other cases may have impacts on time division multiplexing (TDM)/frequency division multiplexing (FDM)/space division multiplexing (SDM) of access and backhaul links, cross-link interference, impact on access UEs, etc.

When using Case 1, all nodes may be synchronized on downlink transmission (DLTX) timing, which may result in interference concerns if applying SDM/FDM on DLTX/uplink transmission (ULTX) links or downlink reception (DLRX)/uplink reception (ULRX) links due to unaligned timing when considering propagation delay. When using Case 2, SDM/FDM can be applied on DLTX/ULTX links, which may result in DLTX timings among child nodes not being aligned since round-trip time (RTT) from each child node is different (advance of ½RTT from parent DLTX timing), and mis-alignments can be accumulated among multiple hops. When using Case 3, SDM/FDM can be applied on DLRX/ULRX links, which may result in DLTX timings among child nodes not being aligned since RTT from each child node is different (delay of ½RTT from parent DLTX timing), and mis-alignments can be accumulated among multiple hops. When using Case 4, SDM/FDM can be applied on DLRX/ULRX links or DLTX/ULTX links, which may result in DLTX timings among child nodes not being aligned (advance of ½RTT from parent node), and mis-alignments can be accumulated among multiple hops. In Case 4, for example, ULRXs at child DU from different grand-child nodes can be aligned at delay of RTT for backhaul communications (RTTBackhaul) from DLTX of child DU. TA to grand-child nodes can be a negative value.

For example, a timing adjustment indication can be similar to that specified in 3GPP Technical Specification (TS) 38.321, as described below. For example, the timing adjustment indication in 3GPP TS 38.321 can indicate the initial $N_{TA}$ used for a timing advance group (TAG). For a subcarrier spacing of $2^\mu \cdot 15$ kilohertz (kHz), the timing advance command for a TAG indicates the change of the uplink timing relative to the current uplink timing for the TAG as multiples of $16 \cdot 64 \cdot T_c/2^\mu$. The start timing of the random access preamble can be similar to that specified 3GPP TS 38.211.

In this example, in case of random access response, a timing advance command $T_A$, for a TAG indicates $N_{TA}$ values by index values of $T_A=0, 1, 2, \ldots, 3846$, where an amount of the time alignment for the TAG for subcarrier spacing of $2^\mu \cdot 15$ kHz is given by $N_{TA}=T_A \cdot 16 \cdot 64/2^\mu$. $N_{TA}$ is defined in 3GPP TS 38.211 and can be relative to the subcarrier spacing of the first uplink transmission from the UE after the reception of the random access response. In other cases, a timing advance command, as in TS 38.321, $T_A$ for a TAG indicates adjustment of the current $N_{TA}$ value, $N_{TA\_old}$, to the new $N_{TA}$ value, $N_{TA\_new}$, by index values of $T_A=0, 1, 2, \ldots, 63$, where for a subcarrier spacing of $2^\mu \cdot 15$ kHz, $N_{TA\_new}=N_{TA\_old}+(T_A-31) \cdot 16 \cdot 64/2^\mu$. If a UE has multiple active UL bandwidth parts (BWPs), in a same TAG, including UL BWPs in two UL carriers of a serving cell, the timing advance command value can be relative to the largest subcarrier spacing of the multiple active UL BWPs. The applicable $N_{TA}$ new value for an UL BWP with lower subcarrier spacing may be rounded to align with the timing advance granularity for the UL BWP with the lower subcarrier spacing while satisfying the timing advance accuracy requirements of 3GPP TS 38.133. In this example, adjustment of $N_{TA}$ value by a positive or a negative amount can indicate advancing or delaying the uplink transmission timing for the TAG by a given amount, respectively.

In this example, for a timing advance command received on uplink slot n, for example, the corresponding adjustment of the uplink transmission timing applies from the beginning of uplink slot n+k where $k=\lceil N_{slot}^{subframe,\mu} \cdot (N_{T,1}+N_{T,2}+N_{TA,max}+0.5)/T_{sf} \rceil$, $N_{T,1}$ is a time duration of $N_1$ symbols corresponding to a PDSCH reception time for PDSCH processing capability 1 when additional PDSCH DM-RS is configured, $N_{T,2}$ is a time duration of $N_2$ symbols corresponding to a PUSCH preparation time for PUSCH processing capability 1, defined in 3GPP TS 38.214, $N_{TA,max}$ is the maximum timing advance value that can be provided by the TA command field of 12 bits, $N_{slot}^{subframe,\mu}$ is a number of slots per subframe, and $T_{sf}$ is the subframe duration of 1 msec. $N_1$ and $N_2$ are determined with respect to the minimum subcarrier spacing among the subcarrier spacings of all configured UL BWPs for all uplink carriers in a TAG and of their corresponding configured DL BWPs. Slot n and $N_{slot}^{subframe,\mu}$ are determined with respect to the minimum subcarrier spacing among the subcarrier spacings of all configured UL BWPs for all uplink carriers in the TAG.

In examples described further herein, an IAB-donor node 202 or upstream IAB-node 204 can convey a DLTX TA to a first IAB-node 204, which may be a value relative to an ULTX TA configured by the IAB-donor node 202 or upstream IAB-node 204 (e.g., in the examples described above with respect to 3GPP TS 38.321 or otherwise). In this example, the first IAB-node 204 can schedule downlink transmissions of its AN-F to one or more UEs 206 or downstream IAB-nodes 204 based on the DLTX (e.g., based on determining the DLTX using a received relative value and the configured ULTX TA). Similarly, for example, the IAB-donor node 202 or upstream IAB-node 204 can convey the ULTX TA to the first IAB-node 204, and the first IAB-node 204 can schedule uplink transmissions of its UE-F to the IAB-donor node 202 or the one or more upstream IAB-nodes 204 based on the ULTX TA.

Turning now to FIGS. 3-10, aspects are depicted with reference to one or more components and one or more methods that may perform the actions or operations described herein, where aspects in dashed line may be optional. Although the operations described below in FIGS. 6-9 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 4:
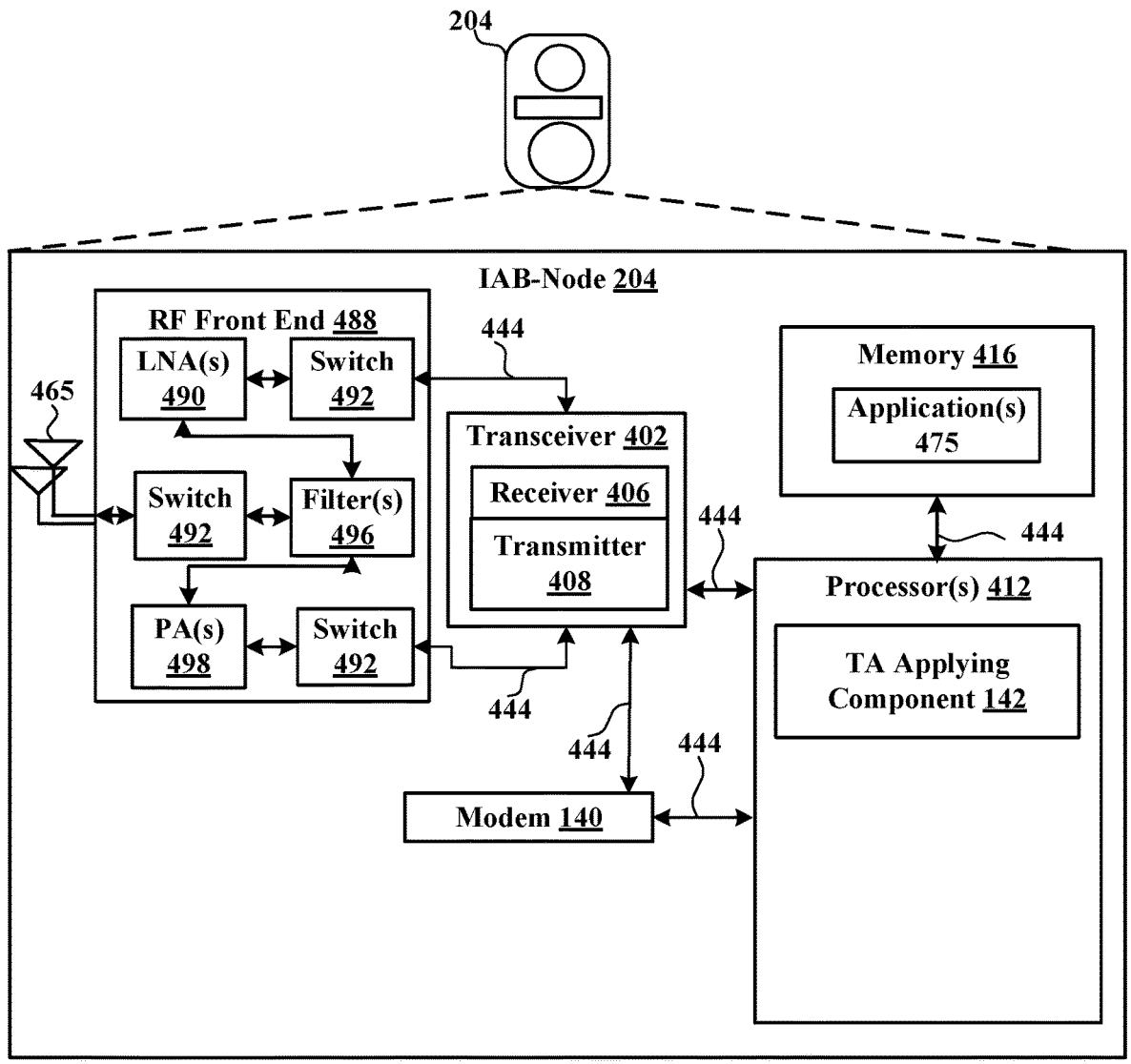
FIG. 4 is a block diagram illustrating an example of an IAB-node, in accordance with various aspects of the present disclosure.

Referring to FIG. 4, one example of an implementation of a IAB-node 204 may include a variety of components, some of which have already been described above and are described further herein, including components such as one or more processors 412 and memory 416 and transceiver 402 in communication via one or more buses 444, which may operate in conjunction with modem 140 and/or TA applying component 142 to enable one or more of the functions described herein related to scheduling transmissions based on a DLTX TA or ULTX TA received from an upstream node.

In an aspect, the one or more processors 412 can include a modem 140 and/or can be part of the modem 140 that uses one or more modem processors. Thus, the various functions related to TA applying component 142 may be included in modem 140 and/or processors 412 and, in an aspect, can be executed by a single processor, while in other aspects, different ones of the functions may be executed by a combination of two or more different processors. For example, in an aspect, the one or more processors 412 may include any one or any combination of a modem processor, or a baseband processor, or a digital signal processor, or a transmit processor, or a receiver processor, or a transceiver processor associated with transceiver 402. In other aspects, some of the features of the one or more processors 412 and/or modem 140 associated with TA applying component 142 may be performed by transceiver 402.

Also, memory 416 may be configured to store data used herein and/or local versions of applications 475 or TA applying component 142 and/or one or more of its subcomponents being executed by at least one processor 412. Memory 416 can include any type of computer-readable medium usable by a computer or at least one processor 412, such as random access memory (RAM), read only memory (ROM), tapes, magnetic discs, optical discs, volatile memory, non-volatile memory, and any combination thereof. In an aspect, for example, memory 416 may be a non-transitory computer-readable storage medium that stores one or more computer-executable codes defining TA applying component 142 and/or one or more of its subcomponents, and/or data associated therewith, when IAB-node 204 is operating at least one processor 412 to execute TA applying component 142 and/or one or more of its subcomponents.

Transceiver 402 may include at least one receiver 406 and at least one transmitter 408. Receiver 406 may include hardware, firmware, and/or software code executable by a processor for receiving data, the code comprising instructions and being stored in a memory (e.g., computer-readable medium). Receiver 406 may be, for example, a radio frequency (RF) receiver. In an aspect, receiver 406 may receive signals transmitted by an upstream node, a downstream node, etc. Additionally, receiver 406 may process such received signals, and also may obtain measurements of the signals, such as, but not limited to, Ec/Io, SNR, RSRP, RSSI, etc. Transmitter 408 may include hardware, firmware, and/or software code executable by a processor for transmitting data, the code comprising instructions and being stored in a memory (e.g., computer-readable medium). A suitable example of transmitter 408 may including, but is not limited to, an RF transmitter.

Moreover, in an aspect, IAB-node 204 may include RF front end 488, which may operate in communication with one or more antennas 465 and transceiver 402 for receiving and transmitting radio transmissions, for example, wireless communications transmitted by at least one base station 102 or wireless transmissions transmitted by IAB-node 204. RF front end 488 may be connected to one or more antennas 465 and can include one or more low-noise amplifiers (LNAs) 490, one or more switches 492, one or more power amplifiers (PAs) 498, and one or more filters 496 for transmitting and receiving RF signals.

In an aspect, LNA 490 can amplify a received signal at a desired output level. In an aspect, each LNA 490 may have a specified minimum and maximum gain values. In an aspect, RF front end 488 may use one or more switches 492 to select a particular LNA 490 and its specified gain value based on a desired gain value for a particular application.

Further, for example, one or more PA(s) 498 may be used by RF front end 488 to amplify a signal for an RF output at a desired output power level. In an aspect, each PA 498 may have specified minimum and maximum gain values. In an aspect, RF front end 488 may use one or more switches 492 to select a particular PA 498 and its specified gain value based on a desired gain value for a particular application.

Also, for example, one or more filters 496 can be used by RF front end 488 to filter a received signal to obtain an input RF signal. Similarly, in an aspect, for example, a respective filter 496 can be used to filter an output from a respective PA 498 to produce an output signal for transmission. In an aspect, each filter 496 can be connected to a specific LNA 490 and/or PA 498. In an aspect, RF front end 488 can use one or more switches 492 to select a transmit or receive path using a specified filter 496, LNA 490, and/or PA 498, based on a configuration as specified by transceiver 402 and/or processor 412.

As such, transceiver 402 may be configured to transmit and receive wireless signals through one or more antennas 465 via RF front end 488. In an aspect, transceiver 402 may be tuned to operate at specified frequencies such that IAB-node 204 can communicate with, for example, one or more upstream nodes or one or more cells associated with one or more upstream nodes, one or more DUs, etc. In an aspect, for example, modem 140 can configure transceiver 402 to operate at a specified frequency and power level based on a configuration of the IAB-node 204 and the communication protocol used by modem 140.

In an aspect, modem 140 can be a multiband-multimode modem, which can process digital data and communicate with transceiver 402 such that the digital data is sent and received using transceiver 402. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of IAB-node 204 (e.g., RF front end 488, transceiver 402) to enable transmission and/or reception of signals from the network based on a specified modem configuration. In an aspect, the modem configuration can be based on the mode of the modem and the frequency band in use. In another aspect, the modem configuration can be based on configuration information associated with IAB-node 204 as provided by the network during cell selection and/or cell reselection or initial access.

In an aspect, the processor(s) 412 may correspond to one or more of the processors described in connection with the base station and/or UE in FIG. 10 to provide an AN-F or UE-F, as described. Similarly, the memory 416 may correspond to the memory described in connection with the base station and/or UE in FIG. 10 to provide an AN-F or UE-F, as described.

Figure 5:
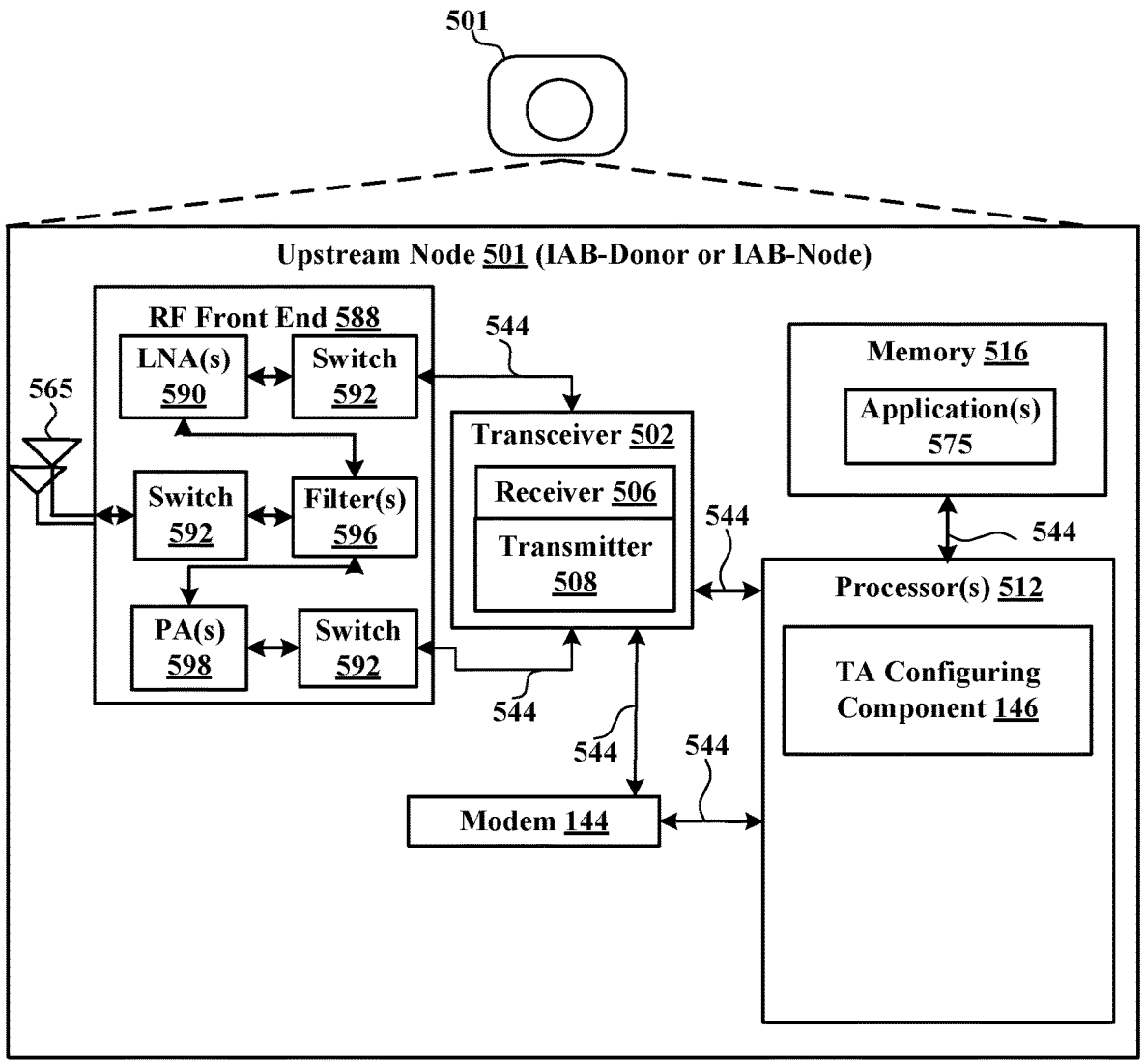
FIG. 5 is a block diagram illustrating an example of an upstream node, in accordance with various aspects of the present disclosure.

Referring to FIG. 5, one example of an implementation of an upstream node 501 (which may be an IAB-donor node 202 or one or more upstream IAB-nodes 204) may include a variety of components, some of which have already been described above, but including components such as one or more processors 512 and memory 516 and transceiver 502 in communication via one or more buses 544, which may operate in conjunction with modem 144 and TA configuring component 146 for configuring a downstream IAB-node with a DLTX TA and/or a ULTX TA for the downstream IAB-node to utilize in communicating with the upstream node 501 or one or more nodes downstream of the downstream IAB-node.

The transceiver 502, receiver 506, transmitter 508, one or more processors 512, memory 516, applications 575, buses 544, RF front end 588, LNAs 590, switches 592, filters 596, PAs 598, and one or more antennas 565 may be the same as or similar to the corresponding components of IAB-Node 204, as described above with reference to FIG. 4, but configured or otherwise programmed for upstream node operations as opposed to downstream node operations.

In an aspect, the processor(s) 512 may correspond to one or more of the processors described in connection with the base station in FIG. 10 to provide an AN-F, as described. Similarly, the memory 516 may correspond to the memory described in connection with the base station in FIG. 10 to provide an AN-F, as described.

Figure 6:
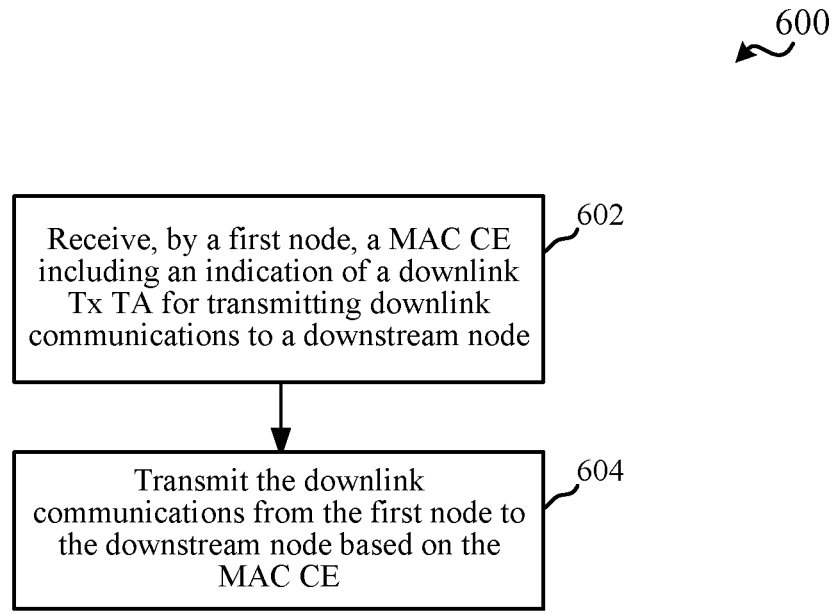
FIG. 6 is a flow chart illustrating an example of a method for applying timing advances, in accordance with various aspects of the present disclosure.
Figure 7:
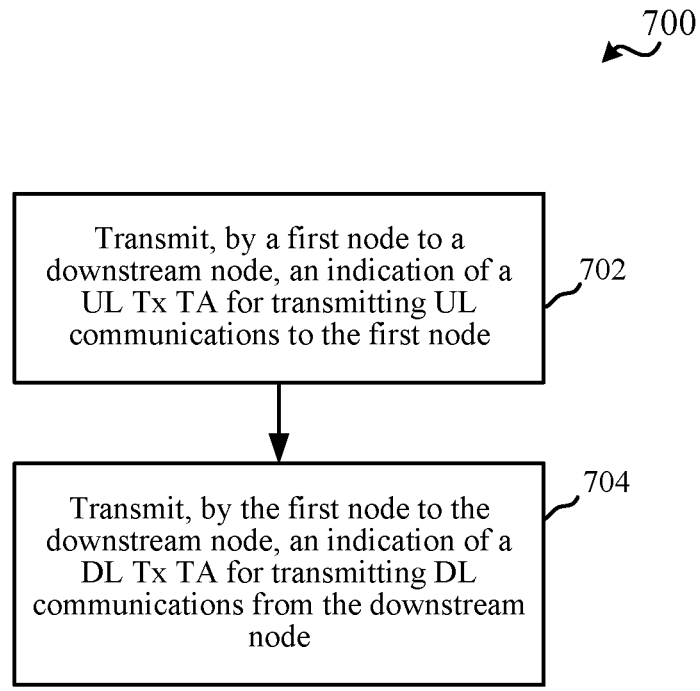
FIG. 7 is a flow chart illustrating an example of a method for configuring timing advances, in accordance with various aspects of the present disclosure.

FIGS. 6 and 7 illustrate flow charts of examples of methods 600 and 700 for configuring and applying a TA in scheduling communications. In an example, an IAB-node 204 can perform the functions described in method 600 using one or more of the components described in FIGS. 2 and 4. In these examples, the method 600 can be performed by a gNB, IAB child node, IAB node with UE-F, etc. In addition, for example, an upstream node 501 can perform the functions described in method 700 using one or more of the components described in FIGS. 2 and 5. In these examples, the method 700 can be performed by a gNB, IAB anchor node, IAB-donor node 202, IAB parent node, an upstream IAB-node 204 with AN-F, etc. Though shown and described in conjunction with one another for ease of explanation, methods 600 and 700 are not required to be performed in conjunction and indeed may be performed by different devices at different times.

In method 700, at Block 702, an indication of a UL Tx TA can be transmitted for transmitting UL communications to a first node can be transmitted by the first node to a downstream node. In an aspect, TA configuring component 146, e.g., in conjunction with processor(s) 512, memory 516, transceiver 502, etc., can transmit, by the first node (e.g., upstream AN-F (e.g., the AN-F of an upstream node 501, such as an IAB-donor node 202, an upstream IAB-node 204, a gNB, an IAB anchor node, IAB parent node, IAB node with AN-F, etc.) the indication of the UL Tx TA to the downstream node (e.g., IAB-node 204) for transmitting the UL transmissions to the first node (e.g., the upstream node). For example, the TA configuring component 146 can transmit the indication of the UL Tx TA as a numeric value in a MAC CE, which may be part of a random access response or another message. For example, TA configuring component 146 can transmit the UL Tx TA as an initial TA command (e.g., in 12 bits and/or conveyed in message 2 of a random access channel (RACH) procedure), as a subsequent relative TA command (e.g., in 6 bits conveyed via MAC-CE) based on a DL Tx TA, as described further herein, etc. In another example, TA configuring component 146 can transmit the UL Tx TA prior to indicating the DL Tx TA (and/or an associated relative value). In this example, TA applying component 142 may determine the DL Tx TA based on the indicated value and the received UL Tx TA, as described further herein.

In method 700, at Block 704, an indication of a DL Tx TA can be transmitted for transmitting DL communications from a downstream node can be transmitted by the first node to the downstream node. In an aspect, TA configuring component 146, e.g., in conjunction with processor(s) 512, memory 516, transceiver 502, etc., can transmit, by the first node (e.g., upstream node) to the downstream node (e.g., IAB-node 204), the indication of the DL Tx TA for transmitting DL communications from the downstream node (e.g., from IAB-node 204 to other downstream IAB-nodes or UEs). In an example, the DL Tx TA can relate to a TA for the downstream node to use in transmitting DL transmissions to a DU. For example, this may be based on the determination to transmit the DL Tx TA based on a raster considerations, as described herein, or another determination to transmit a DL Tx TA to the DU, etc. For example, the TA configuring component 146 can transmit the indication of the DL Tx TA as a numeric value in a MAC CE (e.g., in the same or different MAC CE as used for the UL Tx TA). For example, TA configuring component 146 can transmit the DL Tx TA as an initial TA command (e.g., in 12 bits and/or conveyed in message 2 of a random access channel (RACH) procedure), as a subsequent relative TA command (e.g., in 6 bits conveyed via MAC-CE, such as of a PDSCH) based on a previously transmitted UL Tx TA, etc. Moreover, as described further herein, TA configuring component 146 can configure and transmit the DL Tx TA as a value that is relative to a UL Tx TA.

In method 600, at Block 602, a MAC CE including an indication of a downlink Tx TA for transmitting downlink communications to a downstream node can be received by a first node. In an aspect, TA applying component 142, e.g., in conjunction with processor(s) 412, memory 416, transceiver 402, etc., can receive, by the first node (e.g., IAB-node 204) the MAC CE including the indication of the downlink Tx TA for transmitting downlink communications to the downstream node (e.g., another IAB-node 204 or UE 206). In an example, TA applying component 142 can receive the indication from the upstream AN-F (e.g., the AN-F of an upstream node 501, such as an IAB-donor node 202, an upstream IAB-node 204, a gNB, an IAB anchor node, IAB parent node, IAB node with AN-F, etc.). For example, TA applying component 142 can receive the indication of the DL Tx TA from the AN-F in a MAC-CE transmitted by the AN-F. In addition, for example, TA applying component 142 may convey the TA command to another downstream node (e.g., a DU), such as one or more UEs, another IAB-node 204, etc. Moreover, for example, TA applying component 142 can receive the TA command as an initial TA command (e.g., in 12 bits and/or conveyed in message 2 of a random access channel (RACH) procedure), as a subsequent relative TA command (e.g., in 6 bits conveyed via MAC-CE) relative to a previously received UL Tx TA, etc.

In method 600, at Block 604, the downlink communications can be transmitted from the first node to the downstream node based on the MAC CE. In an aspect, TA applying component 142, e.g., in conjunction with processor(s) 412, memory 416, transceiver 402, etc., can transmit the downlink communications from the first node (e.g., IAB-node 204) to the downstream node (e.g., another IAB-node 204 or UE 206) based on the MAC CE. For example, TA applying component 142 can transmit the downlink data to the downstream node (e.g., one or more DU(s)) based on a received scheduling or resources, where the scheduling may be determined based on the MAC CE, as described, which may be received from the upstream node. In addition, for example, TA applying component 142 can transmit the downlink data to the DU by using the first AN-F of the IAB-node 204 and based on the received DL Tx TA.

Figure 8:
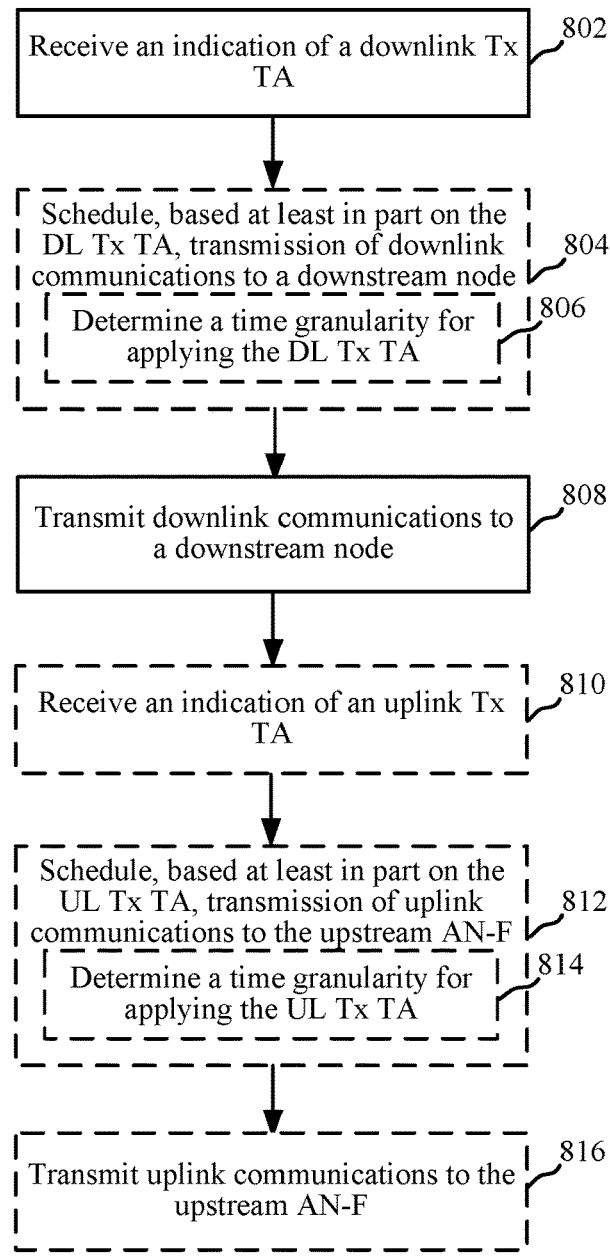
FIG. 8 is a flow chart illustrating an example of a method for applying uplink and/or downlink timing advances, in accordance with various aspects of the present disclosure.
Figure 9:
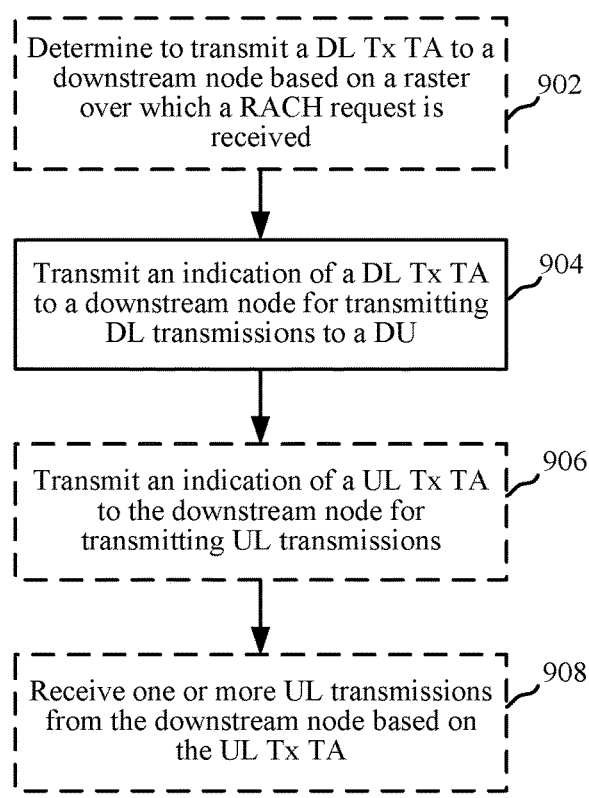
FIG. 9 is a flow chart illustrating an example of a method for configuring uplink and/or downlink timing advances, in accordance with various aspects of the present disclosure.

FIGS. 8 and 9 illustrate flow charts of examples of methods 800 and 900 for configuring and applying a TA in scheduling communications. In an example, an IAB-node 204 can perform the functions described in method 800 using one or more of the components described in FIGS. 2 and 4. In these examples, the method 800 can be performed by a gNB, IAB child node, IAB node with UE-F, etc. In addition, for example, an upstream node 501 can perform the functions described in method 900 using one or more of the components described in FIGS. 2 and 5. In these examples, the method 900 can be performed by a gNB, IAB anchor node, IAB-donor node 202, IAB parent node, an upstream IAB-node 204 with AN-F, etc. Though shown and described in conjunction with one another for ease of explanation, methods 800 and 900 are not required to be performed in conjunction and indeed may be performed by different devices at different times.

In method 900, optionally at Block 902, it can be determined to transmit a DL Tx TA to a downstream node based on a raster over which a random access channel (RACH) request is received. In an aspect, TA configuring component 146, e.g., in conjunction with processor(s) 512, memory 516, transceiver 502, etc., can determine to transmit the DL Tx TA to the downstream node (e.g., an IAB-node 204) based on a raster over which the RACH request is received. In an example, the raster can correspond to a channel raster defined by a wireless communication technology (e.g., 5G NR, LTE, etc.), which can represent a step size between frequency bands that can be used as channels in the wireless communication technology. For example, where the wireless communication technology uses a channel raster of 100 kHz, channels can for use in wireless communications can be defined starting with a starting channel at a starting frequency of a defined bandwidth and continuing with a channel every 100 kHz. For example, the upstream node 501 may determine whether the node transmitting the RACH request (e.g., a message 1 RACH preamble) is regular UE or IAB-node 204 UE-F based on whether initial access happens through off-raster sync (which regular UEs may not use). In an example, the off-raster sync can correspond to a channel or frequency that does not comply with the channel raster, such that the channel or frequency may be outside of a range of channels defined based on the channel raster or otherwise may start at a frequency that is not defined based on the channel raster described above. When the upstream node 501 determines that the node making the request is a child IAB-node 204, it can provide initial TA command for its DL TX timing, but may avoid doing so where it is determined that a UE is making the request. In an example, the actual time for child IAB-node 204 to activate the DL TX timing can be when IAB starts to transmit its secondary synchronization signal (SSS) for service, assuming this IAB-node 204 is ready to start doing so when it accesses the upstream node 501 using its UE-F.

In method 900, at Block 904, an indication of a DL Tx TA can be transmitted to a downstream node transmitting DL transmissions to a DU. In an example, the DL Tx TA can relate to a TA for the downstream node to use in transmitting DL transmissions to the DU. For example, this may be based on the determination to transmit the DL Tx TA at Block 902 or another determination to transmit a DL Tx TA to the DU. In an aspect, TA configuring component 146, e.g., in conjunction with processor(s) 512, memory 516, transceiver 502, etc., can transmit the indication of the DL Tx TA to the downstream node for transmitting the DL transmissions to the DU. For example, the TA configuring component 146 can transmit the indication of the DL Tx TA as a numeric value in a MAC CE. For example, TA configuring component 146 can transmit the DL Tx TA as an initial TA command (e.g., in 12 bits and/or conveyed in message 2 of a random access channel (RACH) procedure), as a subsequent relative TA command (e.g., in 6 bits conveyed via MAC-CE, such as of a PDSCH), etc. Moreover, as described further herein, TA configuring component 146 can configure and transmit the DL Tx TA as a value that is relative to a UL Tx TA.

In method 800, at Block 802, an indication of a downlink Tx TA can be received. In an aspect, TA applying component 142, e.g., in conjunction with processor(s) 412, memory 416, transceiver 402, etc., can receive the indication of the downlink Tx TA. In an example, TA applying component 142 can receive the indication from the upstream AN-F (e.g., the AN-F of an upstream node 501, such as an IAB-donor node 202, an upstream IAB-node 204, a gNB, an JAB anchor node, JAB parent node, JAB node with AN-F, etc.). For example, TA applying component 142 can receive the indication of the DL Tx TA from the AN-F in a MAC-CE transmitted by the AN-F. In addition, for example, TA applying component 142 may convey the TA command to another downstream node (e.g., a DU), such as one or more UEs, another IAB-node 204, etc. Moreover, for example, TA applying component 142 can receive the TA command as an initial TA command (e.g., in 12 bits and/or conveyed in message 2 of a random access channel (RACH) procedure), as a subsequent relative TA command (e.g., in 6 bits conveyed via MAC-CE), etc.

In another example, as described further herein, TA applying component 142 can compute the DL Tx TA based on a relative value received from the upstream node 501, where the relative value may be relative to a UL Tx TA. In one example, TA applying component 142 can compute the DL Tx TA based at least in part on a function or a fraction of the UL Tx TA.

In method 800, optionally at Block 804, transmission of downlink communications to a downstream node can be scheduled based at least in part on the DL Tx TA. In an aspect, TA applying component 142, e.g., in conjunction with processor(s) 412, memory 416, transceiver 402, etc., can schedule, based at least in part on the DL Tx TA, transmission of the downlink communications to the downstream node (e.g., to one or more UEs 206, downstream IAB-nodes 204, etc.). For example, TA applying component 142 can apply the TA value in determining timing for transmitting the downlink communications to the downstream node (e.g., to one or more DU(s)), where the TA value may be a positive or negative value indicated by the indication received at Block 802, a relative value to a configured UL Tx TA, etc. Moreover, in an example, scheduling the data may optionally include, at Block 806, determining a time granularity for applying the DL Tx TA. In an aspect, TA applying component 142, e.g., in conjunction with processor(s) 412, memory 416, transceiver 402, etc., can determine the time granularity for applying the DL Tx TA and/or may multiply the time granularity by the DL Tx TA to determine the actual TA. In one example, TA applying component 142 may determine the time granularity based at least in part on (e.g., as a function of) a tone spacing configured by the upstream node 501, such as based on a minimum, maximum, or other tone spacing, a subcarrier spacing (SCS), etc.

In method 800, at Block 808, downlink communications can be transmitted to a downstream node. In an aspect, TA applying component 142, e.g., in conjunction with processor(s) 412, memory 416, transceiver 402, etc., can transmit downlink communications to the downstream node, which may be based on the MAC CE. For example, TA applying component 142 can transmit the downlink data to the downstream node (e.g., one or more DU(s)) as scheduled, in Block 804, where the scheduling can be determined based on the MAC CE, as described. In addition, for example, TA applying component 142 can transmit the downlink data to the DU by using the first AN-F of the IAB-node 204 and based on the determined DL Tx TA.

In method 900, optionally at Block 906, an indication of a UL Tx TA can be transmitted to a downstream node for transmitting UL transmissions. In an aspect, TA configuring component 146, e.g., in conjunction with processor(s) 512, memory 516, transceiver 502, etc., can transmit the indication of the UL Tx TA to the downstream node for transmitting the UL transmissions to the upstream node 501. For example, the TA configuring component 146 can transmit the indication of the UL Tx TA as a numeric value in a MAC CE, which may be part of a random access response or another message. For example, TA configuring component 146 can transmit the UL Tx TA as an initial TA command (e.g., in 12 bits and/or conveyed in message 2 of a random access channel (RACH) procedure), as a subsequent relative TA command (e.g., in 6 bits conveyed via MAC-CE), etc. In another example, though shown as occurring after transmitting the indication of the DL Tx TA, TA configuring component 146 can transmit the UL Tx TA prior to indicating the DL Tx TA (and/or an associated relative value). In this example, TA applying component 142 may determine the DL Tx TA based on the indicated value and the received UL Tx TA.

In method 800, optionally at Block 810, an indication of an uplink Tx TA can be received. In an aspect, TA applying component 142, e.g., in conjunction with processor(s) 412, memory 416, transceiver 402, etc., can receive (e.g., from an upstream IAB-node 204, a gNB, an IAB anchor node, IAB parent node, IAB node with AN-F, etc.), the indication of the uplink Tx TA. In an example, TA applying component 142 can receive the indication from the upstream AN-F (e.g., the AN-F of an upstream node 501, such as an IAB-donor node 202). For example, TA applying component 142 can receive the indication of the UL Tx TA from the AN-F in a MAC-CE transmitted by the AN-F, which may be the same MAC-CE or a different MAC-CE within which the DL Tx TA is received. In an example, as described, TA applying component 142 may receive the UL Tx TA prior to receiving the indication of the DL Tx TA, as the indication may be based on a value relative to the UL Tx TA. For example, where separate MAC-CE are used for DL Tx TA and UL Tx TA, n-bit relative commands (e.g., n=6) can be sent separately for UL TX and DL TX time of the UE, which can each cover a relative adjustment (e.g., in a range of −32 to +31 for 6-bit).

Where same MAC-CE is used for both DL Tx TA and UL Tx TA, in one example, the total amount of bits allocated for timing adjustment in MAC-CE can be split into changing timing of uplink transmission and downlink transmission. In one example, uplink and downlink transmission adjustment command may consume equal number of bits (e.g., DL TX and UL TX timing can comprise of 3 bits (can cover range of −4 to +3) for 6-bits of MAC-CE). In another example, one of UL/DL transmission time can be considered to be the 'master timing' and the other is considered to be 'slave timing,' such that the master timing can use a first number of bits that is different than (e.g., more than) a second number of bits used for the slave timing. In a specific example, 4 out of 6 bits of relative TA command in MAC-CE can be used to control UL TX TA (e.g., covers −8 to +7 range), and the remaining 2 bits out of 6 bits of relative TA command in MAC-CE provide DL TX TA (e.g., covers −2 to +1 range).

In addition, in one example, the UL TX TA value may be further relative to the DL TX TA value and/or vice versa (e.g., where UL TX command is +6 and DL TX command is −1. This means, effective DL TX command is +5).

In another example, receiving the UL Tx TA can include determining the UL Tx TA as a function of the DL Tx TA (e.g., as a fraction of the DL Tx TA), and/or vice versa.

In method 800, optionally at Block 812, transmission of uplink communications to the upstream AN-F can be scheduled based at least in part on the UL Tx TA. In an aspect, TA applying component 142, e.g., in conjunction with processor(s) 412, memory 416, transceiver 402, etc., can schedule, based at least in part on the UL Tx TA, transmission of the uplink communications to the upstream AN-F (or other upstream node(s)). For example, TA applying component 142 can apply the TA value in determining timing for transmitting the uplink communications, where the TA value may be a positive or negative value indicated by the indication received at Block 810.

Moreover, in an example, scheduling the data may optionally include, at Block 814, determining a time granularity for applying the UL Tx TA. In an aspect, TA applying component 142, e.g., in conjunction with processor(s) 412, memory 416, transceiver 402, etc., can determine the time granularity for applying the DL Tx TA and/or may multiply the time granularity by the UL Tx TA to determine the actual TA. In one example, TA applying component 142 may determine the time granularity based at least in part on (e.g., as a function of) a tone spacing configured by the upstream node 501, such as based on a minimum, maximum, or other tone spacing, a subcarrier spacing (SCS), etc. In one example, the granularity of both the DL Tx TA command and the UL Tx TA command may depend on the functions of the DL and UL tone spacings (e.g., UL Tx can use 120 kHz SCS and DL TX can use 60 kHx SCS, and granularity of both TA commands can be based on 60 kHz SCS). In another example, granularity of the DL Tx TA command and the UL Tx TA command may depend on the functions of the DL and UL tone spacings individually.

In method 800, optionally at Block 816, uplink communications can be transmitted to the upstream AN-F. In an aspect, TA applying component 142, e.g., in conjunction with processor(s) 412, memory 416, transceiver 402, etc., can transmit uplink communications to the upstream AN-F (e.g., of a IAB-donor node 202 or IAB-node 204). For example, TA applying component 142 can transmit the uplink communications using the first UE-F of the IAB-node 204, and/or can transmit the uplink communications as scheduled (e.g., at Block 812).

In method 900, optionally at Block 908, one or more uplink transmissions can be received from the downstream node based on the UL Tx TA. In an aspect, TA configuring component 146, e.g., in conjunction with processor(s) 512, memory 516, transceiver 502, etc., can receive the one or more UL transmissions from the downstream node based on the UL Tx TA.

In some examples, the upstream node 501 (e.g., a Parent node's DU) can provide a TA command for DL TX timing of the IAB-node 204 (e.g., a child node's DU) using a UE Unit (UU) radio interface and through child node's mobile terminal (MT). This can be indicated by central unit and/or via upper-layer signaling/F1AP interface. In another example, DL TX timing of hop n can be half of UL TX timing of hop (n−1).

In addition, for example, a minimum gap (also referred to herein as a "minimum timing gap") between the reception of MAC-CE and the application of DL Tx TA can be defined, and scheduling transmission of the data (e.g., at Block 804) may be based at least in part on the minimum gap. For example, TA applying component 142 may determine the minimum gap based on one or more combinations of N1, N_new, N2, N_TA, L2. In this example, N1 can be the required time for physical downlink shared channel (PDSCH) processing, N2 can be the required time for physical uplink shared channel (PUSCH) generation, N_TA can be time required for timing advance, L2 can be the MAC processing latency (e.g. L2=500 microseconds for TA adjustment in L2), N_new can be the required time to generate PDSCH, etc. In an example, TA applying component 142 may receive one or more of the values in a configuration from the upstream node 501 (e.g., as transmitted by TA configuring component 146). For example, the value(s) may be received along with the indication of DL Tx TA or in a separate configuration. In one example, minimum gap can be defined as N1+N_new+L2+f(N_TA). Child IAB-node 204 may process PDSCH of the MAC-CE that conveys command (which requires L2 processing) and may generate PDSCH for transmitting to its own children nodes. f(N_TA) can depend on whether child IAB-node 204 needs to start its DL TX transmission with a timing advance.

Moreover, in an example, TA applying component 142 may apply the TA in scheduling downlink or uplink communications based on one or more timers, which may be initialized based on receiving a respective TA command (or one or the other TA command where a single timer is used). In this example, TA applying component 142 may refrain from applying the TA after expiration of the one or more timers. For example, TA applying component 142 can initialize a timer based on receiving the indication of the DL Tx TA, where a duration value of the timer may be received in a configuration or otherwise determined. Based on detecting expiration of the timer, TA applying component 142 can refrain from applying the TA, apply a different TA, etc. In an example, if multiple timers are configured, each TA command can expire after the individual timer expires. If same timer is configured, both TA commands (e.g., DL Tx TA and UL Tx TA) can expire after the same timer expires.

Figure 10:
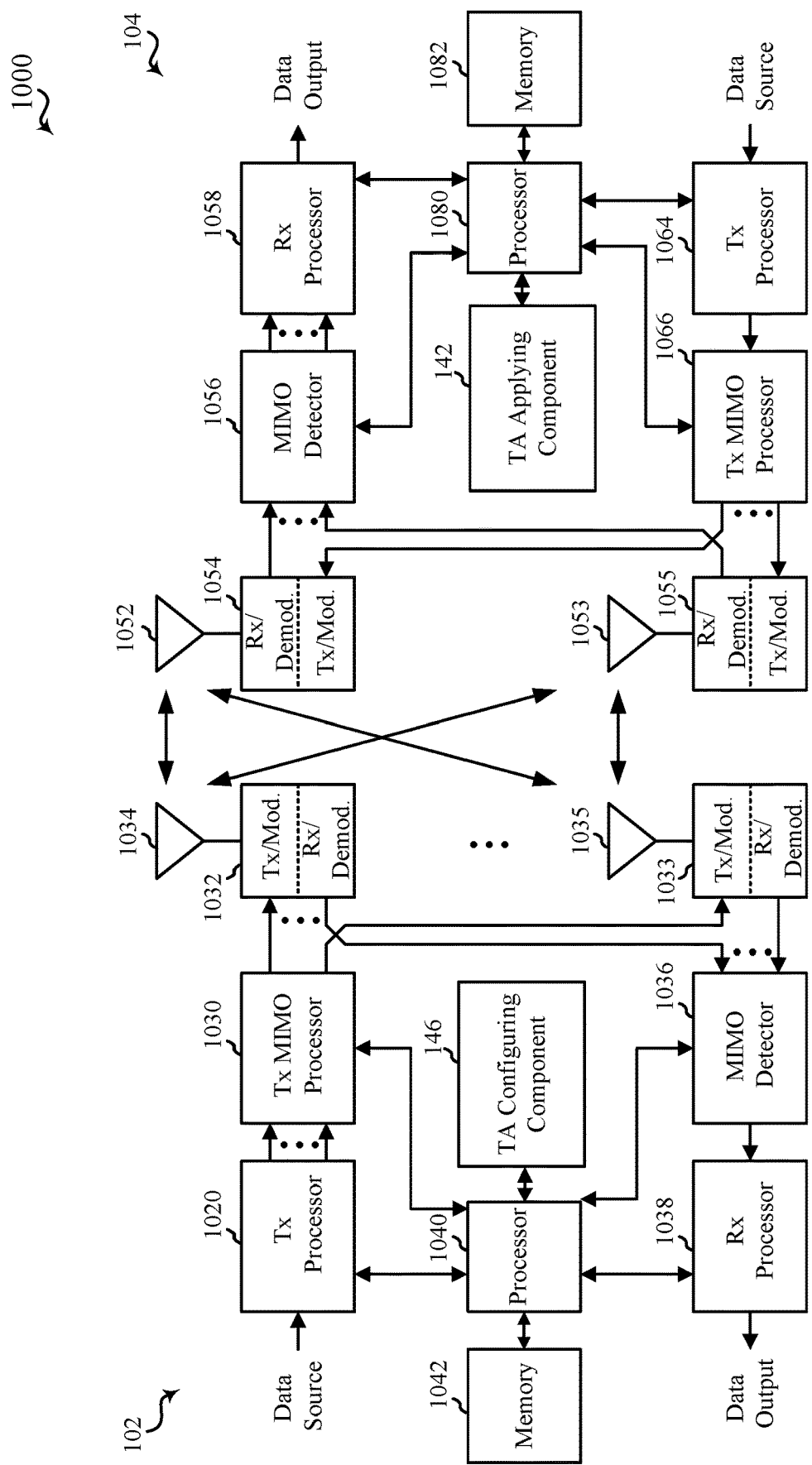
FIG. 10 is a block diagram illustrating an example of a MIMO communication system including a base station and a UE, in accordance with various aspects of the present disclosure.

FIG. 10 is a block diagram of a MIMO communication system 1000 including a base station 102 (or an AN-F of an upstream node that is upstream to an IAB-node 204) and a UE 104 (or a UE-F of the IAB-node 204). The MIMO communication system 1000 may illustrate aspects of the wireless communication access network 100 described with reference to FIG. 1. The base station 102 may be an example of aspects of the base station 102 described with reference to FIG. 1. The base station 102 may be equipped with antennas 1034 and 1035, and the UE 104 may be equipped with antennas 1052 and 1053. In the MIMO communication system 1000, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1020 may receive data from a data source. The transmit processor 1020 may process the data. The transmit processor 1020 may also generate control symbols or reference symbols. A transmit MIMO processor 1030 may perform spatial processing (e.g., precoding) on data symbols, control symbols, or reference symbols, if applicable, and may provide output symbol streams to the transmit modulator/demodulators 1032 and 1033. Each modulator/demodulator 1032 through 1033 may process a respective output symbol stream (e.g., for OFDM, etc.) to obtain an output sample stream. Each modulator/demodulator 1032 through 1033 may further process (e.g., convert to analog, amplify, filter, and upconvert) the output sample stream to obtain a DL signal. In one example, DL signals from modulator/demodulators 1032 and 1033 may be transmitted via the antennas 1034 and 1035, respectively.

The UE 104 may be an example of aspects of the UEs 104 described with reference to FIGS. 1-2, a UE-F of an IAB-node 204, etc. At the UE 104, the UE antennas 1052 and 1053 may receive the DL signals from the base station 102 and may provide the received signals to the modulator/demodulators 1054 and 1055, respectively. Each modulator/demodulator 1054 through 1055 may condition (e.g., filter, amplify, downconvert, and digitize) a respective received signal to obtain input samples. Each modulator/demodulator 1054 through 1055 may further process the input samples (e.g., for OFDM, etc.) to obtain received symbols. A MIMO detector 1056 may obtain received symbols from the modulator/demodulators 1054 and 1055, perform MIMO detection on the received symbols, if applicable, and provide detected symbols. A receive (Rx) processor 1058 may process (e.g., demodulate, deinterleave, and decode) the detected symbols, providing decoded data for the UE 104 to a data output, and provide decoded control information to a processor 1080, or memory 1082.

The processor 1080 may in some cases execute stored instructions to instantiate a TA applying component 142 (see e.g., FIGS. 2 and 3) for communicating with base station 102 or other upstream nodes and/or for communicating with one or more DUs or other downstream nodes.

On the uplink (UL), at the UE 104, a transmit processor 1064 may receive and process data from a data source. The transmit processor 1064 may also generate reference symbols for a reference signal. The symbols from the transmit processor 1064 may be precoded by a transmit MIMO processor 1066 if applicable, further processed by the modulator/demodulators 1054 and 1055 (e.g., for SC-FDMA, etc.), and be transmitted to the base station 102 in accordance with the communication parameters received from the base station 102. At the base station 102, the UL signals from the UE 104 may be received by the antennas 1034 and 1035, processed by the modulator/demodulators 1032 and 1033, detected by a MIMO detector 1036 if applicable, and further processed by a receive processor 1038. The receive processor 1038 may provide decoded data to a data output and to the processor 1040 or memory 1042.

The processor 1040 may in some cases execute stored instructions to instantiate a TA configuring component 146 (see e.g., FIGS. 2 and 4) for communicating with one or more downstream IAB-nodes 204.

The components of the UE 104 may, individually or collectively, be implemented with one or more ASICs adapted to perform some or all of the applicable functions in hardware. Each of the noted modules may be a means for performing one or more functions related to operation of the MIMO communication system 1000. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 1000.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:
   receiving, by an integrated access and backhaul (IAB) node and from an upstream node in a wireless network, an indication of an uplink transmission timing advance for the IAB node to apply to uplink communications for transmitting the uplink communications to the upstream node, wherein the upstream node is one of an IAB donor or an upstream IAB node;
   receiving, by the IAB node and from the upstream node, a media access control (MAC) control element (CE) including an indication of a downlink transmission timing advance for the IAB node to apply for transmitting downlink communications to a downstream node, wherein the indication of the downlink transmission timing advance includes a value that is relative to the uplink transmission timing advance, and wherein the downstream node is one of a user equipment (UE) or a downstream IAB node; and
   transmitting the downlink communications from the IAB node to the downstream node based on the indication of the downlink transmission timing advance.

2. The method of claim 1, further comprising computing the downlink transmission timing advance based at least in part on the value and the uplink transmission timing advance.

3. The method of claim 1, further comprising:
   determining, based at least in part on the uplink transmission timing advance, a timing for transmission of the uplink communications to the upstream node; and
   transmitting the uplink communications from the IAB node to the upstream node based on the timing.

4. The method of claim 1, wherein the indication of the downlink transmission timing advance and the uplink transmission timing advance are received from the upstream node in the MAC CE.

5. The method of claim 1 wherein the indication of the downlink transmission timing advance is received from an upstream access network function of the upstream node.

6. The method of claim 1, wherein receiving the indication of the uplink transmission timing advance comprises receiving a separate MAC CE indicating the uplink transmission timing advance.

7. The method of claim 4, wherein a first number of bits and a second number of bits in the MAC CE are respectively used for the indication of the downlink transmission timing advance and the indication of the uplink transmission timing advance, and wherein the first number is different from the second number.

8. The method of claim 1, further comprising:
   determining a granularity of a timing advance (TA) command corresponding to the uplink transmission timing advance based at least in part on a subcarrier spacing associated with uplink transmissions; and
   determining a timing for transmission of uplink data based at least in part on applying the uplink transmission timing advance to the granularity.

9. The method of claim 1, further comprising:
   determining a granularity of a timing advance (TA) command corresponding to the downlink transmission timing advance based at least in part on a subcarrier spacing associated with downlink transmissions; and
   determining a timing for transmission of data based at least in part on applying the downlink transmission timing advance to the granularity.

10. The method of claim 1, further comprising scheduling, based at least in part on the downlink transmission timing advance, transmission of the downlink communications to the downstream node.

11. The method of claim 1, further comprising transmitting the indication of the downlink transmission timing advance to the downstream node.

12. The method of claim 1, wherein receiving the MAC CE comprises receiving the MAC CE in at least one of a random access channel response message or a subsequent physical downlink shared channel (PDSCH).

13. The method of claim 1, wherein receiving the indication of the downlink transmission timing advance is based at least in part on a raster used by the IAB node to transmit a random access preamble to an upstream node.

14. The method of claim 1, wherein transmitting the downlink communications is based at least in part on determining a minimum timing gap from receiving the indication of the downlink transmission timing advance, wherein determining the minimum timing gap is based on at least one of a time for downlink shared data channel processing, a time for uplink shared data channel processing, a time required for timing advance, a time required to generate downlink shared data channel data, or a MAC processing latency.

15. An apparatus for wireless communication, comprising:
   a transceiver;
   a memory configured to store instructions; and
   one or more processors communicatively coupled with the transceiver and the memory, wherein the one or more processors are configured to:
      receive, from an upstream node in a wireless network, an indication of an uplink transmission timing advance for the apparatus to apply to uplink communications for transmitting the uplink communications to the upstream node, wherein the upstream node is one of an integrated access and backhaul (IAB) donor or an upstream IAB node;
      receive, from the upstream node, a media access control (MAC) control element (CE) including an indication of a downlink transmission timing advance for the apparatus to apply for transmitting downlink communications to a downstream node, wherein the indication of the downlink transmission timing advance includes a value that is relative to the uplink transmission timing advance, and wherein the downstream node is one of a user equipment (UE) or a downstream IAB node; and
      transmit the downlink communications to the downstream node based on the indication of the downlink transmission timing advance.

16. The apparatus of claim 15, wherein the one or more processors are further configured to compute the downlink transmission timing advance based at least in part on the value and the uplink transmission timing advance.

17. The apparatus of claim 15, wherein the one or more processors are further configured to:
   determine, based at least in part on the uplink transmission timing advance, a timing for transmission of the uplink communications to the upstream node; and
   transmit the uplink communications to the upstream node based on the timing.

18. The apparatus of claim 15, wherein the indication of the downlink transmission timing advance and the uplink transmission timing advance are received from the upstream node in the MAC CE.

19. The apparatus of claim 15, wherein the indication of the downlink transmission timing advance is received from an upstream access network function of the upstream node.

20. The apparatus of claim 15, wherein the one or more processors are configured to receive a separate MAC CE indicating the uplink transmission timing advance.

21. The apparatus of claim 15, wherein a first number of bits and a second number of bits in the MAC CE are respectively used for the indication of the downlink transmission timing advance and the indication of the uplink transmission timing advance, and wherein the first number is different from the second number.

22. The apparatus of claim 15, wherein the one or more processors are further configured to:
   determine a granularity of a timing advance (TA) command corresponding to the uplink transmission timing advance based at least in part on a subcarrier spacing associated with uplink transmissions; and
   determine a timing for transmission of uplink data based at least in part on applying the uplink transmission timing advance to the granularity.

23. The apparatus of claim 15, wherein the one or more processors are further configured to:
   determine a granularity of a timing advance (TA) command corresponding to the downlink transmission timing advance based at least in part on a subcarrier spacing associated with downlink transmissions; and
   determine a timing for transmission of data based at least in part on applying the downlink transmission timing advance to the granularity.

24. The apparatus of claim 15, wherein the one or more processors are further configured to schedule, based at least in part on the downlink transmission timing advance, transmission of the downlink communications to the downstream node.

25. The apparatus of claim 15, wherein the one or more processors are further configured to transmit the indication of the downlink transmission timing advance to the downstream node.

26. The apparatus of claim 15, wherein the one or more processors are configured to receive the MAC CE in at least one of a random access channel response message or a subsequent physical downlink shared channel (PDSCH).

27. The apparatus of claim 15, wherein the one or more processors are configured to receive the indication of the downlink transmission timing advance based at least in part on a raster used by the apparatus to transmit a random access preamble to an upstream node.

28. The apparatus of claim 15, wherein the one or more processors are configured to transmit the downlink communications based at least in part on determining a minimum timing gap from receiving the indication of the downlink transmission timing advance, wherein the one or more processors are configured to determine the minimum timing gap based on at least one of a time for downlink shared data channel processing, a time for uplink shared data channel processing, a time required for timing advance, a time required to generate downlink shared data channel data, or a MAC processing latency.

29. An apparatus for wireless communication, comprising:
   means for receiving, from an upstream node in a wireless network, an indication of an uplink transmission timing advance for the apparatus to apply to uplink communications for transmitting the uplink communications to the upstream node, wherein the upstream node is one of an integrated access and backhaul (IAB) donor or an upstream IAB node;
   means for receiving, from the upstream node, a media access control (MAC) control element (CE) including an indication of a downlink transmission timing advance for the apparatus to apply for transmitting downlink communications to a downstream node, wherein the indication of the downlink transmission timing advance includes a value that is relative to the uplink transmission timing advance, and wherein the downstream node is one of a user equipment (UE) or a downstream IAB node; and
   means for transmitting the downlink communications to the downstream node based on the indication of the downlink transmission timing advance.

30. The apparatus of claim 29, further comprising means for computing the downlink transmission timing advance based at least in part on the value and the uplink transmission timing advance.

31. The apparatus of claim 29, further comprising:
   means for determining, based at least in part on the uplink transmission timing advance, a timing for transmission of the uplink communications to the upstream node; and
   means for transmitting the uplink communications to the upstream node based on the timing.

32. The apparatus of claim 29, wherein the indication of the downlink transmission timing advance and the uplink transmission timing advance are received from the upstream node in the MAC CE.

33. The apparatus of claim 29, wherein the indication of the downlink transmission timing advance is received from an upstream access network function of the upstream node.

34. The apparatus of claim 29, wherein the means for receiving the indication of the uplink transmission timing advance receives the indication of the uplink transmission timing advance a separate MAC CE.

35. A non-transitory computer-readable medium, comprising code executable by one or more processors for wireless communications, the code comprising code for:
   receiving, by an integrated access and backhaul (IAB) node and from an upstream node in a wireless network, an indication of an uplink transmission timing advance for the IAB node to apply to uplink communications for transmitting the uplink communications to the upstream node, wherein the upstream node is one of an IAB donor or an upstream IAB node;
   receiving, by the IAB node and from the upstream node, a media access control (MAC) control element (CE) including an indication of a downlink transmission timing advance for the IAB node to apply for transmitting downlink communications to a downstream node, wherein the indication of the downlink transmission timing advance includes a value that is relative to the uplink transmission timing advance, and wherein the downstream node is one of a user equipment (UE) or a downstream IAB node; and transmitting the downlink communications from the IAB node to the downstream node based on the indication of the downlink transmission timing advance.

36. The non-transitory computer-readable medium of claim 35, further comprising code for computing the downlink transmission timing advance based at least in part on the value and the uplink transmission timing advance.

37. The non-transitory computer-readable medium of claim 35, further comprising code for:
determining, based at least in part on the uplink transmission timing advance, a timing for transmission of the uplink communications to the upstream node; and
transmitting the uplink communications from the IAB node to the upstream node based on the timing.

38. The non-transitory computer-readable medium of claim 35, wherein the indication of the downlink transmission timing advance and the uplink transmission timing advance are received from the upstream node in the MAC CE.

39. The non-transitory computer-readable medium of claim 35, wherein the indication of the downlink transmission timing advance is received from an upstream access network function of the upstream node.

40. The non-transitory computer-readable medium of claim 35, wherein the code for receiving the indication of the uplink transmission timing advance receives the indication of the uplink transmission timing advance a separate MAC CE.

41. A method for wireless communication, comprising:
transmitting, by a first node to a downstream integrated access and backhaul (IAB) node, an indication of an uplink transmission timing advance for the downstream IAB node to apply for transmitting uplink communications to the first node, wherein the first node is one of an IAB donor or an upstream IAB node; and
transmitting, by the first node to the downstream IAB node, an indication of a downlink transmission timing advance for the downstream IAB node to apply for transmitting downlink communications from the downstream IAB node, wherein the indication of the downlink transmission timing advance includes a value that is relative to the uplink transmission timing advance.

42. The method of claim 41, further comprising receiving, from the downstream IAB node, one or more uplink transmissions based on the uplink transmission timing advance.

43. The method of claim 41, wherein transmitting the indication of the downlink transmission timing advance is based at least in part on a raster over which a random access channel request is received from the downstream IAB node.

44. The method of claim 41, wherein the indication of the downlink transmission timing advance and the uplink transmission timing advance are is transmitted in a same media access control (MAC) control element (CE).

45. An apparatus for wireless communication, comprising:
a transceiver;
a memory configured to store instructions; and
one or more processors communicatively coupled with the transceiver and the memory, wherein the one or more processors are configured to:
transmit, to a downstream integrated access and backhaul (IAB) node, an indication of an uplink transmission timing advance for the downstream IAB node to apply for transmitting uplink communications to the apparatus; and
transmit, to the downstream IAB node, an indication of a downlink transmission timing advance for the downstream IAB node to apply for transmitting downlink communications from the downstream IAB node, wherein the indication of the downlink transmission timing advance includes a value that is relative to the uplink transmission timing advance.

46. The apparatus of claim 45, wherein the one or more processors are further configured to receive, from the downstream IAB node, one or more uplink transmissions based on the uplink transmission timing advance.

47. The apparatus of claim 45, wherein the one or more processors are configured to transmit the indication of the downlink transmission timing advance based at least in part on a raster over which a random access channel request is received from the downstream IAB node.

48. The apparatus of claim 45, wherein the indication of the downlink transmission timing advance and the uplink transmission timing advance are is transmitted in a same media access control (MAC) control element (CE).

49. An apparatus for wireless communication, comprising:
means for transmitting, to a downstream integrated access and backhaul (IAB) node, an indication of an uplink transmission timing advance for the downstream IAB node to apply for transmitting uplink communications to the apparatus; and
means for transmitting, to the downstream IAB node, an indication of a downlink transmission timing advance for the downstream IAB node to apply for transmitting downlink communications from the downstream IAB node, wherein the indication of the downlink transmission timing advance includes a value that is relative to the uplink transmission timing advance.

50. The apparatus of claim 49, further comprising means for receiving, from the downstream IAB node, one or more uplink transmissions based on the uplink transmission timing advance.

51. The apparatus of claim 49, wherein the means for transmitting the indication of the downlink transmission timing advance transmits based at least in part on a raster over which a random access channel request is received from the downstream IAB node.

52. The apparatus of claim 49, wherein the indication of the downlink transmission timing advance and the uplink transmission timing advance are is transmitted in a same media access control (MAC) control element (CE).

53. A non-transitory computer-readable medium, comprising code executable by one or more processors for wireless communications, the code comprising code for:
transmitting, by a first node to a downstream integrated access and backhaul (IAB) node, an indication of an uplink transmission timing advance for the downstream IAB node to apply for transmitting uplink communications to the first node, wherein the first node is one of an IAB donor or an upstream IAB node; and
transmitting, by the first node to the downstream IAB node, an indication of a downlink transmission timing advance for the downstream IAB node to apply for transmitting downlink communications from the downstream IAB node, wherein the indication of the downlink transmission timing advance includes a value that is relative to the uplink transmission timing advance.

54. The non-transitory computer-readable medium of claim 53, further comprising code for receiving, from the downstream IAB node, one or more uplink transmissions based on the uplink transmission timing advance.

55. The non-transitory computer-readable medium of claim 53, wherein the code for transmitting the indication of the downlink transmission timing advance transmits based at least in part on a raster over which a random access channel request is received from the downstream IAB node.

56. The non-transitory computer-readable medium of claim 53, wherein the indication of the downlink transmission timing advance and the uplink transmission timing advance are is transmitted in a same media access control (MAC) control element (CE).

* * * * *